United States Patent
Triplett et al.

(10) Patent No.: US 6,876,798 B2
(45) Date of Patent: Apr. 5, 2005

(54) FIBER OPTIC CABLE HAVING A RIPCORD

(75) Inventors: James E. Triplett, Lenoir, NC (US); Todd R. Rhyne, Hickory, NC (US); H. Edward Hudson II, Conover, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 10/652,046

(22) Filed: Aug. 29, 2003

(65) Prior Publication Data

US 2005/0036750 A1 Feb. 17, 2005

(51) Int. Cl.[7] ............................................... G02B 6/44
(52) U.S. Cl. ........................ 385/100; 385/104; 385/107
(58) Field of Search ............................... 385/100, 102, 385/104, 107, 112

(56) References Cited

U.S. PATENT DOCUMENTS

| | | | |
|---|---|---|---|
| 4,913,515 A | 4/1990 | Braunmiller et al. | 350/96.23 |
| 5,029,974 A | 7/1991 | Nilsson | 350/96.23 |
| 5,173,961 A | 12/1992 | Chiasson | 385/113 |
| 5,268,983 A | 12/1993 | Tatarka et al. | 385/106 |
| 5,321,788 A | 6/1994 | Arroyo et al. | 385/109 |
| 5,621,841 A | 4/1997 | Field | 385/113 |
| 5,642,452 A | 6/1997 | Gravely et al. | 385/113 |
| 6,088,499 A | 7/2000 | Newton et al. | 385/112 |
| 6,101,305 A * | 8/2000 | Wagman et al. | 385/113 |
| 6,519,399 B2 * | 2/2003 | Strong et al. | 385/114 |
| 6,545,222 B2 | 4/2003 | Yokokawa et al. | 174/110 |
| 6,563,991 B1 | 5/2003 | Witt et al. | 385/107 |
| 6,597,844 B1 | 7/2003 | Witt et al. | 385/109 |
| 6,603,908 B2 | 8/2003 | Dallas et al. | 385/109 |
| 6,636,673 B2 * | 10/2003 | Register et al. | 385/105 |
| 2003/0118295 A1 * | 6/2003 | Lail et al. | 385/101 |
| 2003/0215198 A1 * | 11/2003 | Newton et al. | 385/113 |

FOREIGN PATENT DOCUMENTS

GB 2372262 * 8/2002 ............ G02B/6/44

* cited by examiner

*Primary Examiner*—Chandrika Prasad
(74) *Attorney, Agent, or Firm*—Michael E. Carroll, Jr.

(57) ABSTRACT

A communication cable including at least one communication element having a ripcord for ripping at least one cable component for facilitating access to the communication cable. In one embodiment, the ripcord is formed from a plurality of plies twisted together in a first direction, each of the plurality of plies being formed from a plurality of strands twisted together in a second direction. In another embodiment, the ripcord is formed from at least two different filament materials such as polyester and polyethylene.

35 Claims, 1 Drawing Sheet

FIBER OPTIC CABLE HAVING A RIPCORD

FIELD OF THE INVENTION

The present invention relates to fiber optic cables and, more particularly, to fiber optic cables having a ripcord for ripping at least one cable component.

BACKGROUND OF THE INVENTION

Fiber optic cables include optical fibers that transmit signals, for example, voice, video, and/or data information. In order to make optical terminations craftsmen require access to the optical fibers within the fiber optic cable. Consequently, fiber optic cables may include one or more ripcords for facilitating access to the optical fibers within the cable.

Specifically, ripcords are used for ripping cable components such as an armor tape or a cable jacket of the fiber optic cable. When the craftsman applies a sufficient pulling force to the ripcord, it rips one or more cable components along the length of the cable. The tear facilitates removal of the ripped cable component, thereby aiding the craftsman in accessing the optical fibers within the cable. Conventional ripcords are yarns or threads made from a single material such as aramid fibers. Aramid fibers were typically used because they have a relatively high tensile strength that ensures that the ripcord does not break during the ripping process. The thread or yarn size of a ripcord is generally specified as a denier. A denier is a unit of weight per length (grams per 9000 meters) of material for measuring the fineness of threads, yarns, and the like. Other materials such as nylon or polyester have been used for ripcords; however, these materials generally require a ripcord with a larger diameter for a tensile strength rating similar to aramid fibers. Consequently, nylons and polyesters have typically been used for ripping cable components that are relatively easily rippable such as binders and water-swellable tapes, rather than for high-strength cable components.

For instance, cable components such as an armor layer require relatively high forces for the conventional ripcord to rip therethrough. The relatively high forces required for ripping can cause conventional ripcords to undesirably break during the ripping action, especially nylon or polyester ripcords. Consequently, ripcords intended to rip armor layers were typically aramid fiber ripcords since they provide high-strength with a relatively small diameter, thereby allowing relatively small cable diameters. Aramid fibers can, however, be relatively expensive, thereby increasing manufacturing costs. Additionally, in the past there were aramid fiber shortages that further drove up the expense of aramid fibers.

SUMMARY OF THE INVENTION

The present invention is directed to a communication cable including at least one communication element and a ripcord for ripping at least one cable component for facilitating access to the cable. The ripcord is formed from a plurality of plies twisted together in a first direction, each of the plurality of plies being formed from a plurality of strands twisted together in a second direction.

The present invention is also directed to a fiber optic cable including at least one optical fiber and a ripcord for ripping at least one cable component for facilitating access to the cable. The ripcord being formed from at least two different filament materials and may optionally include a coating thereon.

The present invention is further directed to a fiber optic cable including at least one optical fiber and a ripcord for ripping at least one cable component for facilitating access to the cable. The ripcord has a plurality of plies twisted together in a first direction. The plurality of plies each have a plurality of strands being twisted together in a second direction. Furthermore, at least one of the plies is formed from at least two different filament materials.

Additionally, the present invention is directed to a fiber optic cable including at least one optical fiber and a ripcord for ripping at least one cable component for facilitating access to the cable. The ripcord has a plurality of plies twisted together in a first direction with about 2 to about 5 twists per inch (TPI). Each of the plies contains a plurality of strands being twisted together in a second direction. At least one of the plurality of plies includes at least one polyethylene strand and at least one polyester strand, wherein the plies are twisted together with about 2 to about 5 TPI. The ripcord also has a coating thereon.

BRIEF DESCRIPTION OF THE FIGS.

DETAILED DESCRIPTION OF THE INVENTION

Figure 1:
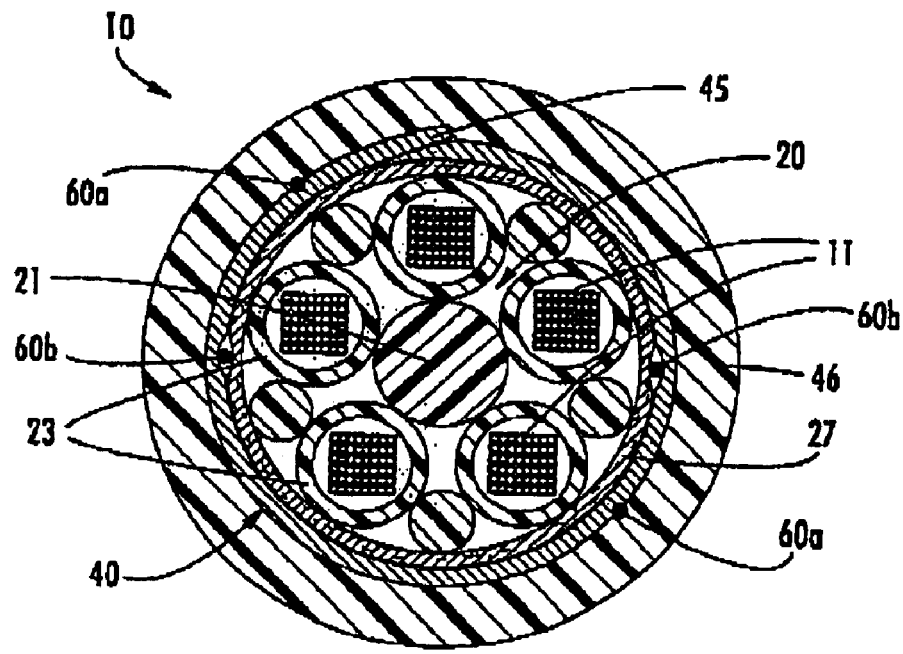
FIG. 1 is a cross-sectional view of a fiber optic cable having at least one ripcord according to the present invention.

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

The present invention will be described with reference to an explanatory fiber optic cable 10 having at least one ripcord therein. Fiber optic cable 10 includes at least one communication element, for instance, an optical fiber 11 therein for transmitting communication signals. As depicted in this case, optical fiber 11 is a portion of a ribbon, but other suitable configurations may be used. Cable 10 includes a cable core 20 and a sheath section 40. Cable core 20 includes a plurality of buffer tubes 23 stranded about a central member 21 that are secured by a first binder (not visible). A water-swellable tape 27 is wrapped about buffer tubes 23 and secured by a second binder (not visible). Sheath section 40 includes an armor tape 45 such as a metallic armor tape and a jacket 46. Cable 10 also includes a plurality of ripcords 60a and 60b. Ripcords are operative to, upon application of a sufficient outwardly directed pulling force, rip through at least a portion of one or more cable components, for example, an armor tape and/or a cable jacket. The ripping procedure can be repeated for as many ripcords as the cable contains.

Specifically, cable 10 includes a first ripcord 60a and a second ripcord 60b. Ripcord 60a is disposed radially outward of armor tape 45 and ripcord 60b is disposed radially inward of armor tape 45. Ripcord 60a is operative to, upon application of a sufficient outwardly directed pulling force, rip jacket 46, thereby obviating the need for a cutting tool to do the same. Eliminating the need for a cutting tool advantageously saves time and avoids potential injury to the craftsman and inadvertent damage the cable. Likewise, second ripcord 60b is operative to, upon application of a sufficient outwardly directed pulling force, rip armor tape 45. In preferred embodiments, cable 10 includes pairs of ripcords 60a and 60b that are located at positions about 180 degrees apart, thereby allowing the removal of the torn jacket or torn armor layer in axial halves. As has been the longstanding practice in the art, each ripcord 60b is preferably disposed at about approximately 90 degrees from the armor overlap to inhibit the ripcord from being cut by an edge of the armor during use.

Figure 2:
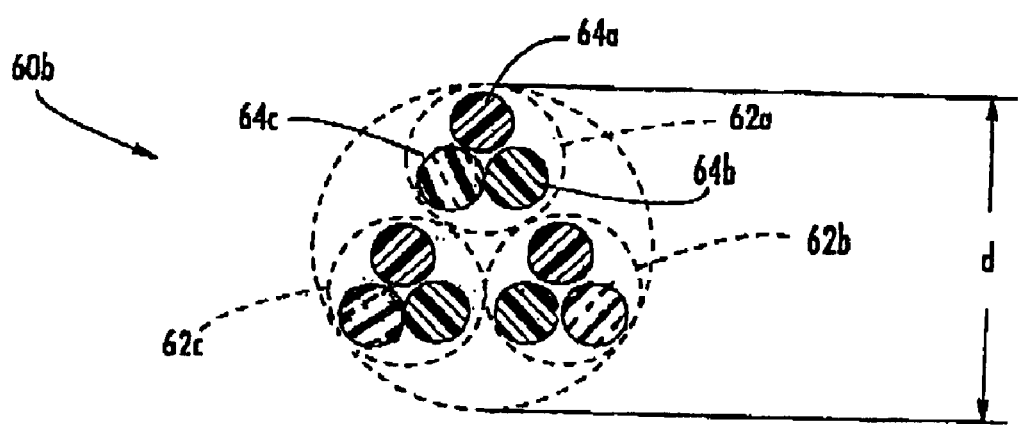
FIG. 2 is an enlarged cross-sectional view of the ripcord of FIG. 1.

As depicted in FIG. 2, ripcord 60b is preferably formed from a plurality of respective plies 62a, 62b, 62c that are twisted together in a first direction such as clockwise. As shown, the individual plies are schematically represented as the smaller dashed circles. The respective plies 62a, 62b, 62c are formed from a plurality of respective strands that are twisted together in a second direction, i.e, counter-clockwise, so that ripcord 60b is torque balanced. In other words, this construction inhibits ripcord 60b from having a shape memory that would induce a curl into the ripcord. In preferred embodiments, ripcord 60b is formed from at least two different filament materials; however, a single filament material or more than two different filament materials may be used. Filament materials for the ripcords of the present invention may be selected from materials such as polyester, polyethylene, nylon, polypropylene, fiberglass, cotton, polyphenylenebenzobisozazole (PBO), polybenzimidazole (PBI), and aramid; however, other suitable materials can be used.

In preferred embodiments, the ripcord of the present invention is a composite of high-strength filaments and buffering filaments. The high-strength filaments generally comprise about 10% to about 70%, by weight, of the filament material of the ripcord and the buffering filaments generally comprise about 30% to about 90%, by weight, of the filament material of the ripcord. Examples of high-strength filaments are aramid, fiberglass, polyethylene, PBO, PBI, and polypropylene. Similarly, examples of buffering filaments are polyester, nylon, and cotton. However, other suitable materials may be used for the high-strength or buffering materials. Likewise, the concepts of the present invention may use other suitable percentages of ripcord material compositions.

The preferred embodiment for ripcord 60b is advantageously a non-aramid construction as described herein, but other embodiments employing the concepts of the present invention may use aramid filaments. In ripcord 60b, each ply 62a, 62b, 62c has a similar construction so only ply 62a of ripcord 60b is described herein; however, other embodiments of the present invention may have plies with differing constructions. Ply 62a includes three strands 64a, 64b, 64c that are twisted together in first direction such as counter-clockwise with about 2 to about 5 twists per inch (TPI), more preferably, the TPI of strands 64a, 64b, 64c is in the range of about 2.5 to about 4 TPI. The three similar plies 62a, 62b, 62c of ripcord 60b are twisted together in a second direction such as clockwise with a TPI in the range of about 2 to about 5. More preferably, the plies have a TPI in the range of about 3 to about 3.5 TPI.

In this embodiment, strands 64a and 64b are a high-tenacity polyester and ply 64c is a high modulus polyethylene (HMPE). Examples of HMPEs are materials such as SPECTRA available from Honeywell of Morris Township, N.J. or Dyneema available from DSM High Performance Fibers of Heerlen, Netherlands. As a general rule of thumb, high-tenacity polyesters have a denier of about nine grams or greater, but other suitable polyesters are within the scope of the invention. By way of example, the filament content of ripcord 60b is in the range about 51% to about 75%, by weight, of polyester and the polyethylene content is in the range of about 25% to about 49% by weight. Of course, other suitable filament contents and/or combinations are possible.

Ripcord 60b preferably has a relatively small diameter so that it does not unnecessarily increase the cable diameter and inhibits the creation of a local bulge in the cable. For instance, ripcord 60b has a diameter d of about 0.1 inches or less, more preferably, about 0.07 inches or less, and most preferably about 0.05 inches or less.

Optionally, ripcord 60b may include a coating (not visible) thereon for lubricity and inhibiting fraying of the ripcord. In other words, the coating is for lubricating the tear region during the ripping action, thereby reducing the force required to sustain the ripping action. For instance, the coating may be a silicone oil that is applied to ripcord 60b using a coating die with the excess being being wiped off. Of course, other suitable coatings such as waxes or the like may be used for the intended purposes of lubricity and inhibiting fraying. Additionally, the denier of ripcord 60b will vary depending on the amount of coating applied. The intended purpose of the ripcord will also influence its design, i.e., the cable components to be ripped. In this embodiment where the ripcord is intended to rip a metal armor, the denier of ripcord 60b may vary between about 4000 to about 8000. But generally speaking, ripcords of the present invention may have a denier between about 2000 to about 8000. Furthermore, ripcord 60b has a predetermined ultimate tensile strength so that it will not break during the ripping action. In preferred embodiments, ripcords have an ultimate tensile strength of about 75 Newtons or greater depending upon the intended use. For ripping the metal armor, ripcord 60b preferably has an ultimate tensile strength of about 450 Newtons.

The polyester strands of ripcord 64a and 64b are a buffering material and the polyethylene strand 64c is a relatively high-strength material. Specifically, the polyester strands act as a buffering material that generally locally isolates and/or protects the high-strength polyethylene. Stated another way, the polyester strands act to inhibit the polyethylene strands of the plies from abrading against each other during the ripping action. If the polyethylene strands rub against each other during the ripping process they can rip and/or cut against each other, thereby reducing diameter carrying the pulling force and reducing the ultimate strength of ripcord 60b during the ripping action. This reduction of the ultimate strength of the ripcord may result in an undesirable failure of the ripcord during the ripping process.

Additionally, the stranding of the polyester strands with the polyethylene strands allows the polyethylene to withstand abrasion, bending, and maintains the ripcord integrity. By stranding the filaments different portions of the ripcord act as the ripping edge against the cable component being ripped. In order words, the strand/ply that is ripping the cable component alternate along the length of the ripcord. On the other hand, conventional unstranded ripcords use the same side/portion of the ripcord for ripping, which is more likely to cause ripcord failure. Thus, the ripcords of the present invention are generally better for maintaining ripcord integrity and inhibiting ripcord failures.

Ripcord 60a can be similar to ripcord 60b, but in other embodiments ripcord 60a may have different configurations.

By way of example, ripcord 60a is similar to ripcord 60b except that the three plies are formed from aramid strands and polyester strands. Specifically, ripcord 60a has one aramid strand and two polyester strands that are twisted together in a first direction. Thereafter, the three plies of ripcord 60a are twisted together in a second direction. Additionally, the thickness of jacket 46 and/or the material used for the jacket may influence the construction of the ripcord used. For instance, a flame-retardant material or thicker jacket may require a more robust ripcord.

When it is desired to access the optical fibers within cable 10, the cable jacket is cut so that the craftsman can access ripcord(s) 60a. Next, a sufficient pulling force is applied to ripcord(s) 60a, thereby ripping jacket 46 along the longitudinal axis of cable 10. Thereafter, the craftsman opens up armor tape 45 so that ripcord(s) 60b can be accessed. Similarly, a sufficient pulling force is applied to ripcord(s) 60b, thereby ripping armor tape 45 along the longitudinal axis of cable 10. Thus, the craftsman has access to the buffer tubes that house the optical fibers.

Other embodiments according to the concepts of the present invention are possible. For instance, other non-aramid embodiments may substitute either nylon or cotton for the polyester, i.e., the buffering filaments. Likewise, other embodiments may substitute polypropylene, PBO, PBI, or fiberglass for the polyethylene, i.e., the high-strength filaments. Additionally, as discussed, the present invention contemplates embodiments that substitute aramid for the polyethylene, i.e., the high-strength filaments. Thus, the amount of aramid required in the particular cable design is reduced compared with an all aramid ripcord construction. Still other variations of the present invention are possible. For instance, ripcords may include other numbers of plies besides three and/or other numbers of strands in a ply besides three. Likewise, the strand materials of the plies of a ripcord may vary among one or more of the plies.

In view of the present disclosure, many modifications and other embodiments of the present invention, within the scope of the appended claims, will become apparent to a skilled artisan. For example, ripcords of the present invention may be disposed in any suitable location within a fiber optic cable for ripping desired cable components. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to a loose tube fiber optic cable, but the inventive concepts of the present invention are applicable to any suitable fiber optic cable. Likewise, the inventive concepts should not be limited to fiber optic cables since they are applicable to electric and/or composite cables that include at least one communication element such as copper wires.

What which is claimed:

1. A communication cable, comprising:
   at least one communication element; and
   a ripcord for ripping at least one cable component for facilitating access to the cable, the ripcord being formed from a plurality of plies twisted together in a first direction, each of the plurality of plies being formed from a plurality of strands twisted together in a second direction, wherein the ripcord comprises a high-strength filament material content of about 10% to about 70% and a buffering filament material content being in the range of about 30% to about 90%.

2. The communication cable of claim 1, the ripcord having three plies twisted together with about 2 to about 5 twists per inch (TPI), the three plies each comprising at least one polyethylene strand and at least one polyester strand being twisted together with about 2 to about 5 TPI.

3. The communication cable of claim 1, the ripcord having a coating thereon.

4. The communication cable of claim 1, the ripcord having a denier in the range of about 2000 to about 8000.

5. The communication cable of claim 1, the cable having an armor layer and the ripcord being disposed radially inward of the armor layer for ripping the armor layer when a sufficient force is applied to the ripcord.

6. The communication cable of claim 1, the ripcord having a diameter of about 0.1 inches or less.

7. The communication cable of claim 1, the ripcord having at least two different filament materials, the at least two filament materials being selected from the group consisting of polyester, polyethylene, nylon, polypropylene, fiberglass, cotton, PBO, PBI, and aramid.

8. The communication cable of claim 1, the ripcord having an ultimate tensile strength of about 75 Newtons or greater.

9. A fiber optic cable, comprising:
   at least one optical fiber; and
   a ripcord for ripping at least one cable component for facilitating access to the cable, the ripcord being formed from at least two different filament materials.

10. The fiber optic cable of claim 9, the ripcord having a plurality of plies twisted together, the plurality of plies each having a plurality of strands.

11. The fiber optic cable of claim 9, the ripcord having three plies twisted together with about 2 to about 5 twists per inch (TPI), the three plies each comprising at least one polyethylene strand and at least one polyester strand being twisted together with about 2 to about 5 TPI.

12. The fiber optic cable of claim 9, the ripcord having a coating thereon.

13. The fiber optic cable of claim 9, the ripcord having a denier in the range of about 2000 to about 8000.

14. The fiber optic cable of claim 9, the cable having an armor layer and the ripcord being disposed radially inward of the armor layer for ripping the armor layer when a sufficient force is applied to the ripcord.

15. The fiber optic cable of claim 9, the ripcord having a diameter of about 0.1 inches or less.

16. The fiber optic cable of claim 9, the at least two filament different materials being selected from the group consisting of polyester, polyethylene, nylon, polypropylene, fiberglass, cotton, PBO, PBI, and aramid.

17. The fiber optic cable of claim 9, the ripcord having an ultimate tensile strength of about 75 Newtons or greater.

18. The fiber optic cable of claim 9, the ripcord having a first filament material being a polyester, the filament content of the polyester being in the range about 51% to about 75% of the filament materials and a second filament material being a polyethylene, the filament content of the polyethylene being in the range of about 25% to about 49% of the filament materials.

19. The fiber optic cable of claim 9, the ripcord having a high-strength filament material generally comprising about 10% to about 70% of the filament materials and a buffering filament material generally comprising about 30% to about 90% of the filament materials.

20. A fiber optic cable, comprising:
   at least one optical fiber; and
   a ripcord for ripping at least one cable component for facilitating access to the cable, the ripcord having a plurality of plies twisted together in a first direction, the plurality of plies each having a plurality of strands being twisted together in a second direction, at least one of the plies being formed from at least two different filament materials.

21. The fiber optic cable of claim 20, the ripcord having three plies twisted together with about 2 to about 5 twists per inch (TPI), the at least one ply having a polyethylene strand and two polyester strands being twisted together with about 2 to about 5 twists per inch.

22. The fiber optic cable of claim 20, the ripcord having a coating thereon.

23. The fiber optic cable of claim 20, the ripcord having a denier in the range of about 2000 to about 8000.

24. The fiber optic cable of claim 20, the cable having an armor layer and the ripcord being disposed radially inward of the armor layer for ripping the armor layer when a sufficient force is applied to the ripcord.

25. The fiber optic cable of claim 20, the ripcord having a diameter of about 0.1 inches or less.

26. The fiber optic cable of claim 20, the at least two filament different materials being selected from the group consisting of polyester, polyethylene, nylon, polypropylene, fiberglass, cotton, PBO, PBI, and aramid.

27. The fiber optic cable of claim 20, the ripcord having an ultimate tensile strength of about 75 Newtons or greater.

28. The fiber optic cable of claim 20, the ripcord having a first filament material being a polyester, the filament content of the polyester being in the range about 51% to about 75% of the filament materials and a second filament material being a polyethylene, the filament content of the polyethylene being in the range of about 25% to about 49% of the filament materials.

29. The fiber optic cable of claim 20, the ripcord having a high-strength filament material generally comprising about 10% to about 70% of the filament materials and a buffering filament material generally comprising about 30% to about 90% of the filament materials.

30. A fiber optic cable, comprising:
  at least one optical fiber; and
  a ripcord for ripping at least one cable component for facilitating access to the cable, the ripcord having a plurality of plies twisted together in a first direction with about 2 to about 5 twists per inch (TPI), the plurality of plies each having a plurality of strands being twisted together in a second direction, at least one of the plurality of plies comprising at least one polyethylene strand and at least one polyester strand, wherein the plies are twisted together with about 2 to about 5 TPI, and a coating on the ripcord.

31. The fiber optic cable of claim 30, the ripcord having a denier in the range of about 2000 to about 8000.

32. The fiber optic cable of claim 30, the cable having an armor layer and the ripcord being disposed radially inward of the armor layer for ripping the armor layer when a sufficient force is applied to the ripcord.

33. The fiber optic cable of claim 30, the ripcord having a diameter of about 0.1 inches or less.

34. The fiber optic cable of claim 30, said ripcord having an ultimate tensile strength of about 75 Newtons or greater.

35. The fiber optic cable of claim 30, the ripcord having a filament of polyester being An the range about 51% to about 75% and a polyethylene being in the range of about 25% to about 49%.

* * * * *